(12) United States Patent
Noguchi

(10) Patent No.: US 11,377,107 B2
(45) Date of Patent: Jul. 5, 2022

(54) VEHICLE SPEED CONTROL DEVICE

(71) Applicant: ADVICS CO., LTD., Kariya (JP)

(72) Inventor: Mako Noguchi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 208 days.

(21) Appl. No.: 16/628,369

(22) PCT Filed: Jul. 31, 2018

(86) PCT No.: PCT/JP2018/028614
§ 371 (c)(1),
(2) Date: Jan. 3, 2020

(87) PCT Pub. No.: WO2019/026894
PCT Pub. Date: Feb. 7, 2019

(65) Prior Publication Data
US 2020/0216072 A1    Jul. 9, 2020

(30) Foreign Application Priority Data

Jul. 31, 2017 (JP) .............................. JP2017-148145

(51) Int. Cl.
*B60W 30/18* (2012.01)
*B60W 10/04* (2006.01)
*B60W 40/105* (2012.01)

(52) U.S. Cl.
CPC ...... *B60W 30/18036* (2013.01); *B60W 10/04* (2013.01); *B60W 40/105* (2013.01); *B60W 2510/18* (2013.01); *B60W 2520/06* (2013.01); *B60W 2520/10* (2013.01); *B60W 2720/10* (2013.01)

(58) Field of Classification Search
None
See application file for complete search history.

(56) References Cited

U.S. PATENT DOCUMENTS

| | | |
|---|---|---|
| 2001/0025220 A1 | 9/2001 | Kaneko et al. |
| 2017/0129479 A1* | 5/2017 | Sunahara ............ B60W 30/045 |
| 2017/0129480 A1* | 5/2017 | Sunahara ........ B60W 30/18145 |
| 2017/0129481 A1* | 5/2017 | Umetsu ............... B60W 30/045 |
| 2017/0129482 A1* | 5/2017 | Sunahara ............ B60W 30/045 |
| 2018/0273024 A1* | 9/2018 | Umetsu ................. B60W 30/02 |

FOREIGN PATENT DOCUMENTS

| | | |
|---|---|---|
| JP | 10-73033 A | 3/1998 |
| JP | 2001-234838 A | 8/2001 |
| JP | 2004-28332 A | 1/2004 |
| JP | 2014-152733 A | 8/2014 |

OTHER PUBLICATIONS

International Search Report dated Nov. 6, 2018 in PCT/JP2018/028614 filed on Jul. 31, 2018, 2 pages.

* cited by examiner

*Primary Examiner* — Genna M Mott
(74) *Attorney, Agent, or Firm* — Oblon, McClelland, Maier & Neustadt, L.L.P.

(57) ABSTRACT

A vehicle speed control device executes a reverse speed control that controls the speed of the vehicle when reversing, on the basis of a target speed that is set in accordance with a control operation when the reverse range is selected using the shift device of the vehicle. During the reverse speed control, the vehicle speed control device calculates so as to reduce a target acceleration. which is a target value for acceleration of the vehicle when the vehicle speed when reversing is increased toward the target speed, as the operation amount of the steering wheel increases.

10 Claims, 8 Drawing Sheets

BRAKING OPERATION
AMOUNT
BPV

VEHICLE SPEED
VS

BRAKING OPERATION
AMOUNT
BPV

STEERING OPERATION
AMOUNT
STR

VEHICLE SPEED
VS

VEHICLE SPEED CONTROL DEVICE

TECHNICAL FIELD

The present invention relates to a vehicle speed control device that performs speed control so that a vehicle speed of when the vehicle is reversing becomes a target speed when a reverse range is selected by a shift device of the vehicle.

BACKGROUND ART

Patent Literature 1 discloses a control device that controls the vehicle speed of when the vehicle is reversing based on the operation of the braking operation member, regardless of the operation of the accelerator pedal, when the reverse range is selected by the shift device of the vehicle. In this control device, the target speed, which is the target value of the vehicle speed of when the vehicle is reversing, is increased as the operation amount of the braking operation member is smaller. Therefore, when the operation amount of the braking operation member decreases, the target speed increases, and the vehicle speed of when the vehicle is reversing increases toward the target speed.

CITATIONS LIST

Patent Literature

Patent Literature 1: Japanese Unexamined Patent Application Publication No. 2014-152733

SUMMARY OF INVENTION

Technical Problems

For example, when the vehicle is reversing by the speed control as described above, the acceleration of the vehicle that the driver potentially requests may be different between when the steering operation is performed and when the steering operation is not performed. That is, even if the operation amount of the braking operation member is the same, the acceleration that the driver potentially requests is not necessarily the same. Therefore, in the device for reversing the vehicle at the target speed based on the operation amount of the braking operation member, there is still room for improvement in having the acceleration of the vehicle until the vehicle speed reaches the target speed to a magnitude that matches the potential request of the driver.

Solutions to Problems

A vehicle speed control device for solving the problems described above includes a target speed setting unit that sets a target speed, which is a target value of a vehicle speed of when a vehicle is reversing, based on a braking operation amount of the vehicle when a reverse range is selected with a shift device of the vehicle; and an acceleration control unit that controls an acceleration of the vehicle until the vehicle speed when raising the vehicle speed toward the target speed of when the vehicle is reversing reaches the target speed. When a position of a steering wheel when the vehicle is moving straight is a reference position, the acceleration control unit decreases the acceleration of the vehicle until the vehicle speed of when the vehicle is reversing reaches the target speed as the operation amount of the steering wheel from the reference position increases.

In reversing the vehicle, when the operation amount of the steering wheel is large and the turning amount of the vehicle is large, it is necessary to check the surrounding in a wider range than when the operation amount of the steering wheel is small and the turning amount of the vehicle is small. Specifically, the driver needs to pay more attention to the safety confirmation of the turning destination of the front end of the vehicle or the side of the vehicle. Thus, if the acceleration of the reversing vehicle is large when the driver needs to be more careful in checking the surroundings, the driver may find it difficult to drive. That is, when the operation amount of the steering wheel is large, it can be assumed that the driver is potentially seeking for gradual acceleration as compared with the case where the operation amount of the steering wheel is small. According to the above configuration, the larger the operation amount of the steering wheel, the smaller the acceleration of the vehicle until the reverse speed of the vehicle reaches the target speed. Thus, the vehicle can be accelerated more slowly when the driver needs more attention to check the surroundings.

DESCRIPTION OF EMBODIMENTS

Hereinafter, a control device 10 which is an embodiment of a vehicle speed control device will be described with reference to FIGS. 1 to 10.

Figure 1:
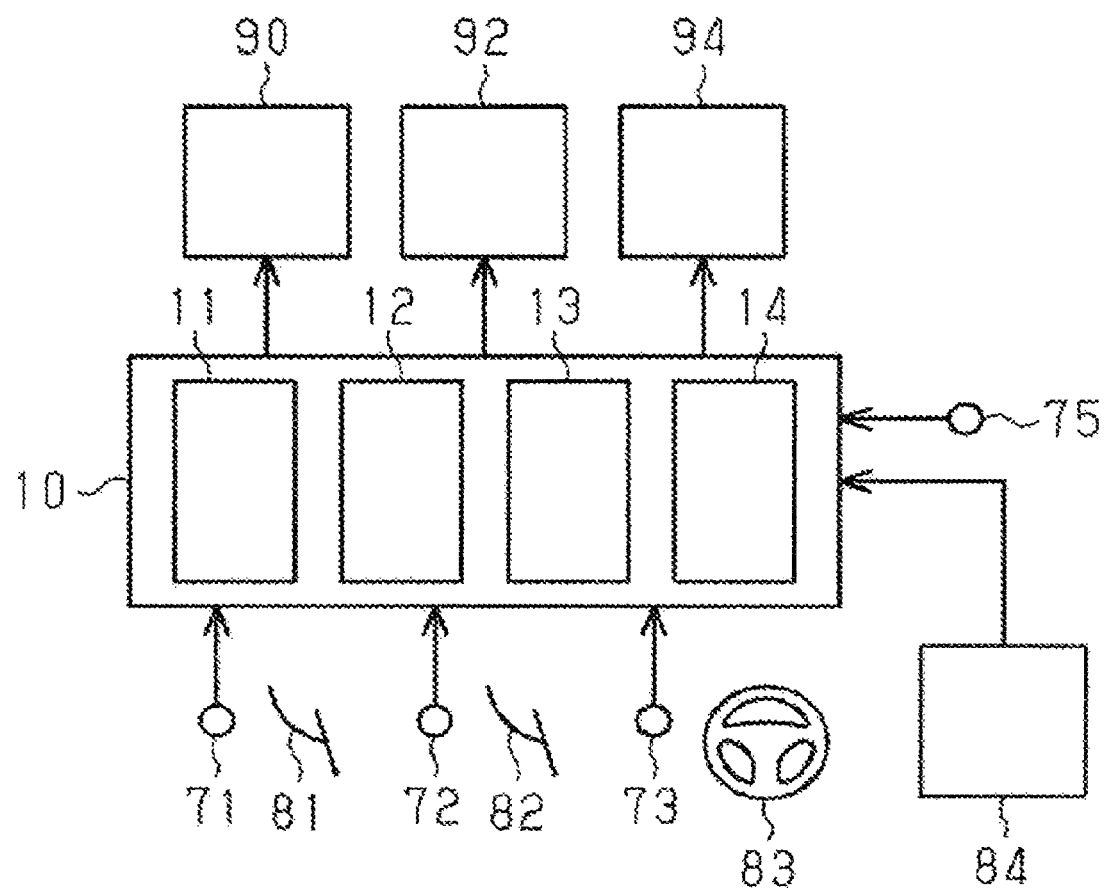
FIG. 1 is a view showing a schematic configuration of a control device which is an embodiment of a vehicle speed control device and a vehicle to which the control device is applied.

FIG. 1 shows a schematic configuration of the control device 10 and a vehicle on which the control device 10 is mounted. An internal combustion engine 90, a braking device 92, and a transmission 94 of the vehicle are controlled by the control device 10. The vehicle includes an accelerator pedal 81, a brake pedal 82, a steering wheel 83, and a shift device 84.

Detection signals are input to the control device 10 from various sensors provided in the vehicle. As shown in FIG. 1, such sensors include an accelerator sensor 71 that detects the operation amount of the accelerator pedal 81, a brake sensor 72 that detects the operation amount of the brake pedal 82, an steering position sensor 73 that detects the operation amount of a steering wheel 83, and a vehicle speed sensor 75 that detects the vehicle speed VS.

The control device 10 calculates an accelerator operation amount APV which is an operation amount of the accelerator pedal 81 based on a detection signal from the accelerator sensor 71. Then, the control device 10 calculates a change speed of the accelerator operation amount APV per unit time as an accelerator operation speed APA.

The control device 10 calculates a braking operation amount BPV which is an operation amount of the brake pedal 82 based on the detection signal from the brake sensor 72. Then, the control device 10 calculates a decreasing speed of the braking operation amount BPV per unit time as a braking decreasing speed BPA. Therefore, the braking decreasing speed BPA is a positive value when the braking operation amount BPV is decreasing, and the braking decreasing speed BPA is a negative value when the braking operation amount BPV is increasing.

The control device 10 calculates a steering operation amount STR which is a displacement amount when the steering wheel 83 is rotated based on the detection signal from the steering position sensor 73. When the position of the steering wheel 83 in moving the vehicle straight is set as the reference position, the steering operation amount STR is calculated as a relative operation angle having the reference position set to "0". The steering operation amount STR is calculated as a positive value when the steering wheel 83 is rotated to the right. On the other hand, when the steering wheel 83 is rotated to the left, the steering operation amount STR is calculated as a negative value. Hereinafter, rotating the steering wheel 83 is referred to as "steering operation".

Further, the control device 10 calculates the steering operation speed STA as the operation speed of the steering wheel 83 from the change in the steering operation amount STR per unit time. In the present embodiment, the steering operation speed STA is treated as a positive value regardless of the increase, decrease, "positive", or "negative" of the steering operation amount STR.

The control device 10 calculates the vehicle speed VS as the vehicle speed based on the detection signal from the vehicle speed sensor 75. Furthermore, the control device 10 calculates the acceleration AC of the vehicle from the change in the vehicle speed VS per unit time.

A signal output from the shift device 84 is input to the control device 10. The signal includes information on a range selected by the driver of the vehicle operating the shift device 84. The control device 10 grasps the range selected by the shift device 84 based on the signal.

When the R range for reverse is selected by the shift device 84, the control device 10 executes a reverse speed control of controlling the vehicle speed VS of when the vehicle is reversing based on the target speed VST set according to the operation of the brake pedal 82. In the reverse speed control, the acceleration AC of the vehicle is adjusted based on the braking decreasing speed BPA and the target acceleration ACT corresponding to the operation mode of the steering wheel 83 while having the target speed VST as the target of the vehicle speed VS by controlling the output torque of the internal combustion engine 90 and the braking force applied to the wheels by the braking device 92.

The control device 10 includes an acceleration control unit 11, a target speed setting unit 12, a suppression amount setting unit 13, and a reference setting unit 14 as functional units for performing the reverse speed control.

The target speed setting unit 12 calculates the target speed VST based on the braking operation amount BPV.

The suppression amount setting unit 13 calculates an acceleration suppression amount IHO used for calculating the target acceleration ACT based on the operation mode of the steering wheel 83, that is, the steering operation amount STR and the steering operation speed STA.

The reference setting unit 14 calculates a reference acceleration ACB used for calculating the target acceleration ACT based on the braking decreasing speed BPA.

The acceleration control unit 11 calculates a target acceleration ACT as a target value of the acceleration AC of the vehicle when the vehicle speed VS of when the vehicle is reversing is increased toward the target speed VST. The acceleration control unit 11 calculates a difference obtained by subtracting the acceleration suppression amount IHO from the reference acceleration ACB as the target acceleration ACT. Then, the acceleration control unit 11 causes the vehicle to travel based on the target acceleration ACT until the vehicle speed VS reaches the target speed VST set by the target speed setting unit 12. For example, when the acceleration AC of the vehicle is smaller than the target acceleration ACT, the acceleration control unit 11 increases the output torque of the internal combustion engine 90 or decreases the braking force of the vehicle. Furthermore, when the acceleration AC of the vehicle is greater than the target acceleration ACT, the acceleration control unit 11 decreases the output torque of the internal combustion engine 90 or increases the braking force of the vehicle.

Figure 2:
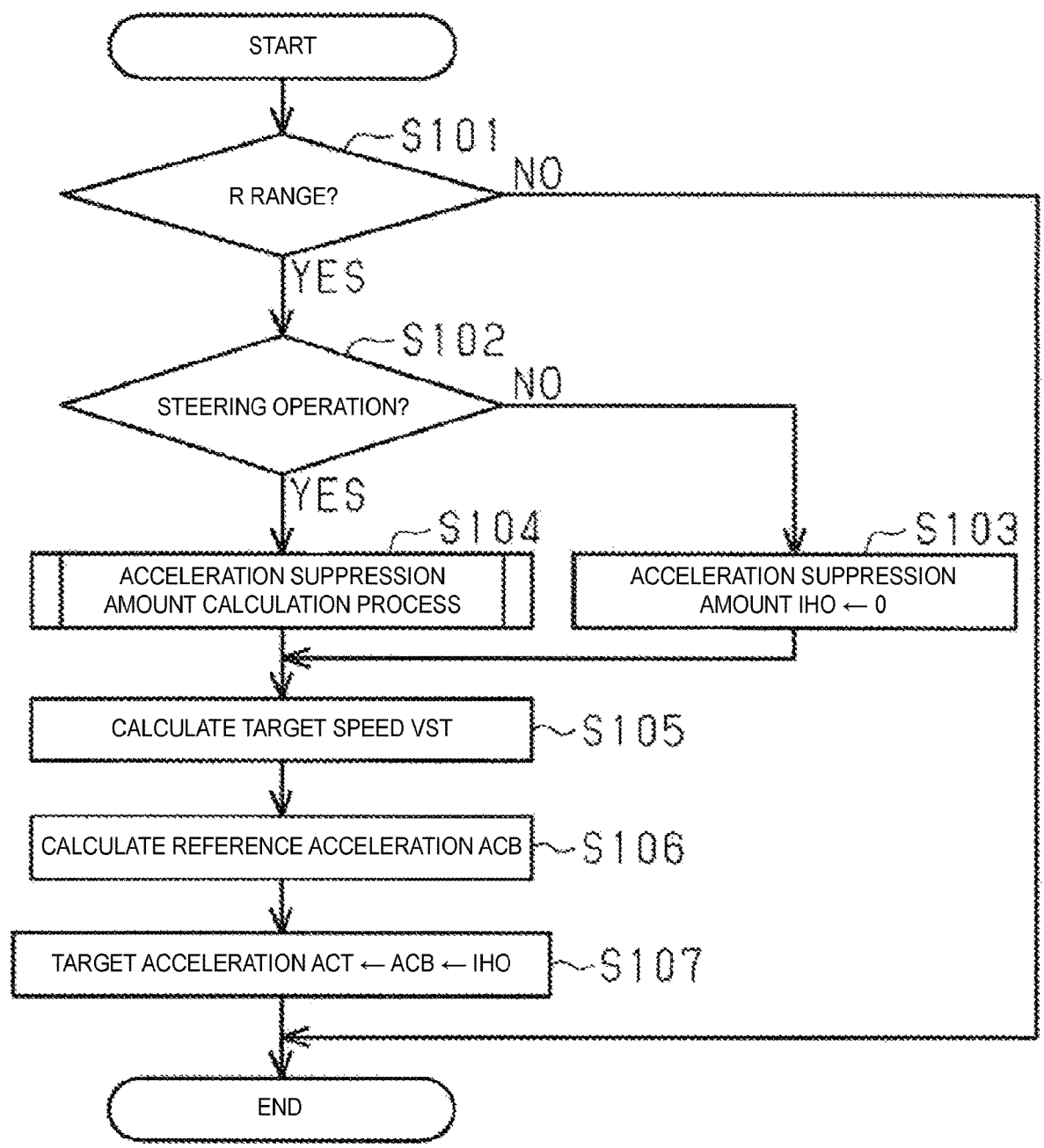
FIG. 2 is a flowchart showing a processing routine executed to calculate a target speed and a target acceleration in the control device.

A processing routine executed by the control device 10 to set the target acceleration ACT will be described with reference to FIG. 2. This processing routine is repeatedly executed every predetermined time.

When the processing routine is executed, first in step S101, whether or not the shift range selected by the shift device 84 is the R range is determined. When a range other than the R range is selected (S101: NO), the present processing routine is temporarily terminated. On the other hand, when the R range is selected (S101: YES), the process proceeds to step S102.

In step S102, the control device 10 determines whether or not there is a steering operation. For example, when both the steering operation amount STR is "0" and the steering operation speed STA is less than or equal to the allowable speed are satisfied, it can be determined that there is no steering operation. On the other hand, when at least one of the steering operation amount STR is "0" and the steering operation speed STA is less than or equal to the allowable speed is not satisfied, it can be determined that there is a steering operation. The allowable speed is set to a value greater than "0" so that it can be determined whether or not the steering wheel 83 is operated by the driver. Accordingly, determination that there is no steering operation can be prevented from being mistakenly made while the steering operation is being continuously performed so that the steering operation amount STR crosses the reference position, that is, the steering operation amount STR is determined from the positive value to the negative value.

In step S102, it can be determined that there is no steering operation when both the absolute value of the steering operation amount STR is less than or equal to a predetermined allowable value and the steering operation speed STA is less than or equal to the allowable speed are satisfied. In this case, it can be determined that there is steering operation when at least one of the absolute value of the steering operation amount STR is less than or equal to a predetermined allowable value and the steering operation speed STA is less than or equal to the allowable speed are satisfied. The allowable value may be set to a value that is large enough to determine that the vehicle is more or less in a range of moving straight based on the absolute value of the steering operation amount STR being less than or equal to the allowable value. In order to determine that the vehicle is moving straight, the allowable value is preferably as small as possible.

If there is a steering operation (S102: YES), the process proceeds to step S104. In step S104, an acceleration suppression amount calculation process for calculating the acceleration suppression amount IHO is executed by the suppression amount setting unit 13. Details of the calculation process will be described later with reference to FIG. 5. After the acceleration suppression amount IHO is calculated, the process proceeds to step S105.

On the other hand, when there is no steering operation (S102: NO), the process proceeds to step S103. In step S103, the suppression amount setting unit 13 sets "0" to the acceleration suppression amount IHO. Thereafter, the process proceeds to step S105.

Figure 3:
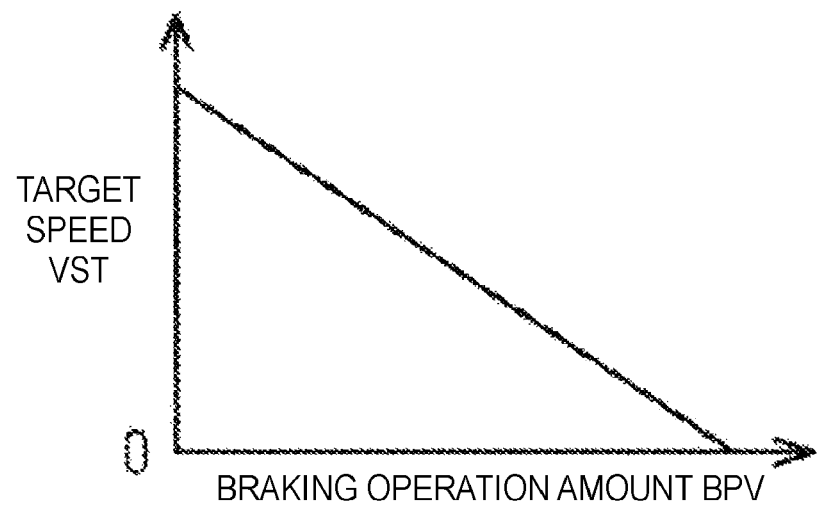
FIG. 3 is a map showing a relationship between a braking operation amount and a target speed used for reverse speed control.

In step S105, the target speed VST is calculated by the target speed setting unit 12. The target speed VST is calculated using the map shown in FIG. 3. FIG. 3 shows the relationship between the braking operation amount BPV and the target speed VST. This map is stored in the target speed setting unit 12. As shown in FIG. 3, the larger the braking operation amount BPV, the smaller the target speed VST is calculated. Therefore, the target speed VST can be reduced as the braking operation amount BPV increases by calculating the target speed VST with reference to the map.

In calculating the target speed VST, when the braking operation amount BPV is "0" and the accelerator operation amount APV is increased by the operation of the accelerator pedal 81, the target speed VST is calculated based on the accelerator operation amount APV. In this case, the target speed VST is calculated to be larger as the accelerator operation amount APV is larger. However, when the braking operation amount BPV is not "0", even if the accelerator pedal 81 is operated, the accelerator operation amount APV is not reflected in calculating the target speed VST.

Then, after the target speed VST is calculated, the process proceeds to step S106.

Figure 4:
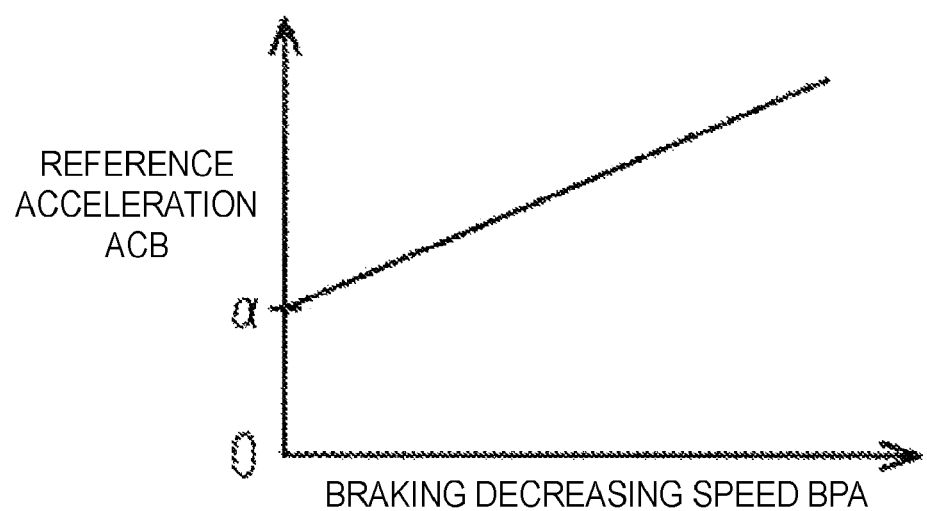
FIG. 4 is a map showing a relationship between braking decreasing speed and reference acceleration used for reverse speed control.

In step S106, the reference acceleration ACB is calculated by the reference setting unit 14. The reference acceleration ACB is calculated using the map shown in FIG. 4. FIG. 4 shows the relationship between the braking decreasing speed BPA and the reference acceleration ACB when the braking decreasing speed BPA is a value greater than or equal to "0". This map is stored in the reference setting unit 14. As shown in FIG. 4, when the braking decreasing speed BPA is "0", the reference acceleration ACB is calculated to be "a" which is a value greater than "0". When the braking decreasing speed BPA is greater than "0", the reference acceleration ACB is calculated to be larger as the braking decreasing speed BPA is larger. Therefore, by calculating the reference acceleration ACB with reference to the map, the reference acceleration ACB can be increased as the braking decreasing speed BPA is larger with respect to "a" which is the value of the reference acceleration ACB when the braking decreasing speed BPA is "0".

In calculating the reference acceleration ACB, when the braking operation amount BPV is "0" and the accelerator pedal 81 is operated, the reference acceleration ACB is calculated based on the accelerator operation speed APA. That is, the reference acceleration ACB is calculated so as to become larger as the accelerator operation speed APA becomes larger. At this time, when the accelerator operation speed APA is greater than or equal to a predetermined threshold value, a guard value is set with respect to the reference acceleration ACB, and the reference acceleration ACB is calculated so as not to exceed the guard value. However, when the braking operation amount BPV is not "0", even if the accelerator pedal 81 is operated, the accelerator operation speed APA is not reflected in calculating the reference acceleration ACB.

Then, after the reference acceleration ACB is calculated, the process proceeds to step S107.

In step S107, a value obtained by subtracting the acceleration suppression amount IHO from the reference acceleration ACB by the acceleration control unit 11 is set as the target acceleration ACT. When there is no steering operation (S102: NO), the process of step S103 is executed and the acceleration suppression amount IHO is set to "0", so the value of the reference acceleration ACB is set as the target acceleration ACT. After the target acceleration ACT is calculated, the present processing routine is terminated.

Figure 5:
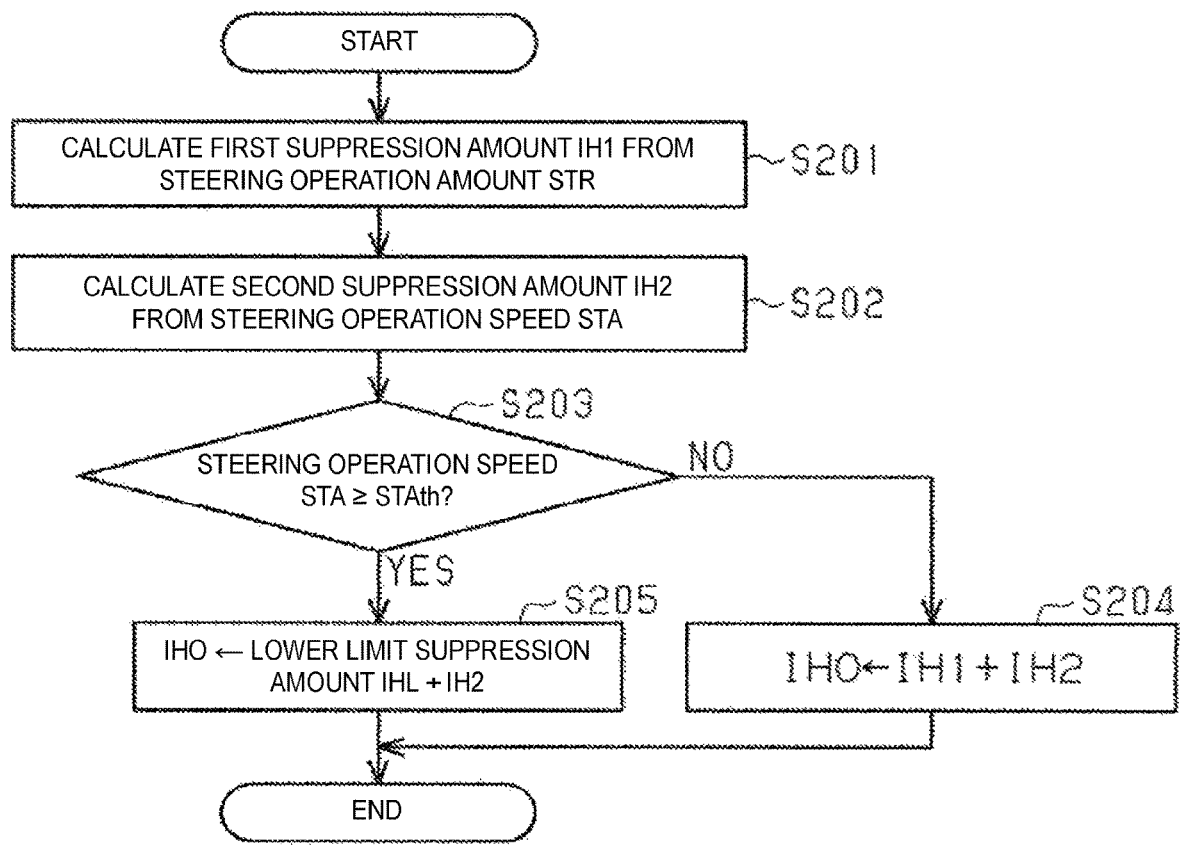
FIG. 5 is a flowchart showing a processing routine of an acceleration suppression amount calculation process executed by the control device.

Next, the acceleration suppression amount calculation process executed in step S104 will be described with reference to FIG. 5. The acceleration suppression amount calculation process is executed by the suppression amount setting unit 13.

Figure 6:
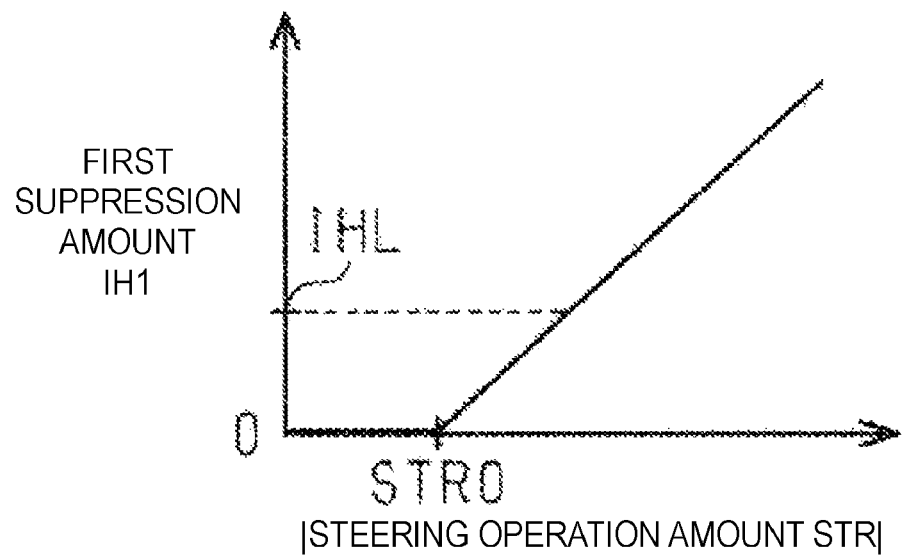
FIG. 6 is a map showing a relationship between a first suppression amount and a steering operation amount used for calculating an acceleration suppression amount.

When the present processing routine is executed, first, in step S201, a first suppression amount IH1 is calculated from the steering operation amount STR. The first suppression amount IH1 is a value greater than or equal to "0" calculated using the map shown in FIG. 6. FIG. 6 shows the relationship between the absolute value of the steering operation amount STR and the first suppression amount IH1. This map is stored in the acceleration control unit 11. As shown in FIG. 6, when the absolute value of the steering operation amount STR is less than or equal to a predetermined operation amount STR0, the first suppression amount IH1 is set to "0". On the other hand, when the absolute value of the steering operation amount STR is greater than the predetermined operation amount STR0, the value of the first suppression amount IH1 gradually increases as the absolute value of the steering operation amount STR increases. Therefore, the first suppression amount IH1 increases as the absolute value of the steering operation amount STR increases. Then, after calculating the first suppression amount IH1, the process proceeds to step S202.

Figure 7:
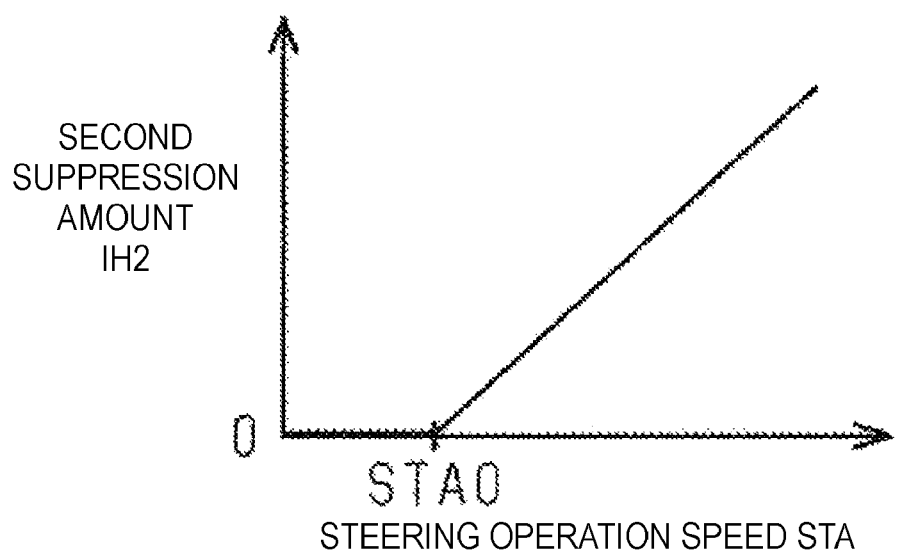
FIG. 7 is a map showing a relationship between a second suppression amount and a steering operation speed used for calculating an acceleration suppression amount.

In step S202, the second suppression amount IH2 is calculated from the steering operation speed STA. The second suppression amount IH2 is a value greater than or equal to "0" calculated using the map shown in FIG. 7. FIG. 7 illustrates the relationship between the steering operation speed STA and a second suppression amount IH2. This map is stored in the acceleration control unit 11. As shown in FIG. 7, when the steering operation speed STA is less than or equal to the predetermined speed STA0, the second suppression amount IH2 is set to "0". On the other hand, when the steering operation speed STA is greater than the predetermined speed STA0, the value of the second suppression amount IH2 gradually increases as the steering operation speed STA increases. Therefore, the second suppression amount IH2 increases as the steering operation speed STA increases. Then, after calculating the second suppression amount IH2, the process proceeds to step S203.

In step S203, whether or not the steering operation speed STA is greater than or equal to a specified speed STAth is determined. The specified speed STAth is set as a criterion for determining whether or not there is a possibility the driver's attention to the surroundings of the vehicle is lowered by the steering operation. When the steering operation speed STA is smaller than the specified speed STAth (S203: NO), the process proceeds to step S204. In step S204, the acceleration suppression amount IHO is calculated by adding the second suppression amount IH2 to the first suppression amount IH1. Thereafter, the present processing routine is terminated.

On the other hand, when the steering operation speed STA is greater than or equal to the specified speed STAth (S203: YES), the process proceeds to step S205. In step S205, the acceleration suppression amount IHO is calculated by adding the second suppression amount IH2 to the lower limit suppression amount IHL. The lower limit suppression amount IHL is a value stored in advance in the suppression amount setting unit 13 as a value for suppressing the target acceleration ACT from increasing during the steering operation by the driver. The lower limit suppression amount IHL is set to a value greater than "0" as indicated by a broken line in FIG. 6. After calculating the acceleration suppression amount IHO, the present processing routine is terminated.

According to the acceleration suppression amount calculation process executed by the suppression amount setting unit 13, when the steering operation speed STA is greater than or equal to the specified speed STAth, the second suppression amount IH2 is added to the lower limit suppression amount IHL to calculate the acceleration suppression amount IHO. Since the acceleration suppression amount IHO is a value greater than or equal to the lower limit suppression amount IHL, the lower limit suppression amount IHL is the minimum value of the acceleration suppression amount IHO. That is, when the steering operation speed STA is greater than or equal to the specified speed STAth, the suppression amount setting unit 13 sets the acceleration suppression amount IHO so that the minimum value of the acceleration suppression amount IHO when the steering operation speed STA is greater than or equal to the specified speed STAth is greater than the minimum value of the acceleration suppression amount IHO when the steering operation speed STA is less than the specified speed STAth.

Next, the operation of the control device 10 according to the present embodiment and its effect will be described.

Figure 8A:
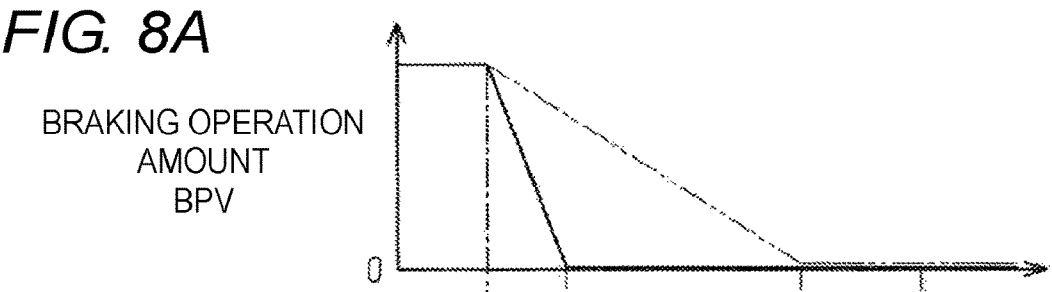
FIG. 8 is a timing chart when reverse speed control is executed by the control device.
Figure 8B:
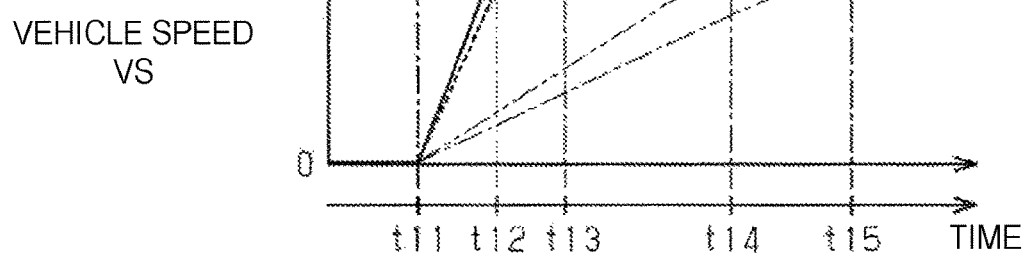

FIG. 8 shows a change in the vehicle speed VS when the reverse speed control is executed. FIG. 8 shows the change in the vehicle speed VS when there is no steering operation (S102: NO). In FIG. 8(a), two examples with different braking decreasing speeds BPA are shown by a solid line and a two-dot chain line. In FIG. 8(b), the transition of the target speed VST corresponding to the example indicated by the solid line in FIG. 8(a) is indicated by a solid line, and the transition of the vehicle speed VS corresponding to the example indicated by the solid line in FIG. 8(a) is indicated by a broken line. Furthermore, in FIG. 8(b), the transition of the target speed VST corresponding to the example indicated by the two-dot chain line in FIG. 8(a) is shown by the two-dot chain line, and the transition of the vehicle speed VS corresponding to the example indicated by the two-dot chain line in FIG. 8(a) is shown by a one-dot chain line. In the example indicated by the solid line in FIG. 8(a), the decrease in the braking operation amount BPV is started from timing t11, and the braking operation amount BPV becomes "0" at timing t12. On the other hand, in the example indicated by the two-dot chain line in FIG. 8(a), the decrease in the braking operation amount BPV is started from timing t11, and the braking operation amount BPV becomes "0" at timing t14 later than timing t12. That is, the braking decreasing speed BPA in the example indicated by the two-dot chain line is smaller than the braking decreasing speed BPA in the example indicated by the solid line.

As shown in FIG. 8(a), after the timing t11, the braking operation amount BPV starts to decrease as the driver of the vehicle decreases the operation amount of the brake pedal 82. Then, the target speed VST is calculated based on the braking operation amount BPV by the process of step S105. Furthermore, the target acceleration ACT is set by the processes of step S103, step S106, and step S107. When there is no steering operation as in the example shown in FIG. 8, the acceleration suppression amount IHO is "0", and hence the target acceleration ACT becomes the value of the reference acceleration ACB calculated based on the braking decreasing speed BPA.

In the example shown by the solid line in FIG. 8(a) where the braking decreasing speed BPA is large, the broken line shown in FIG. 8(b) corresponds to the transition of the vehicle speed VS according to the acceleration AC. That is, in the period from timing t11 to timing t12, the braking operation amount BPV is decreasing and the braking decreasing speed BPA is greater than "0", so the target acceleration ACT (=ACB) is greater than "a". On the other hand, after timing t12, the braking decreasing speed BPA is "0", so the target acceleration ACT (=ACB) is "a". Then, the acceleration ends at timing t13 when the vehicle speed VS reaches the target speed VST. In the reverse speed control, the driving of the internal combustion engine 90 and the braking device 92 is controlled so that the acceleration AC of the vehicle approaches the target acceleration ACT set in such a manner.

Furthermore, in the example shown by the two-dot chain line in FIG. 8(a) where the braking decreasing speed BPA is small, the one-dot chain line shown in FIG. 8(b) corresponds to the transition of the vehicle speed VS according to the acceleration AC. That is, in the period from timing t11 to timing t14, the braking operation amount BPV is decreasing and the braking decreasing speed BPA is greater than "0", so the target acceleration ACT (=ACB) is greater than "a". On the other hand, after timing t14, the braking decreasing speed BPA is "0", so the target acceleration ACT (=ACB) is "a". Then, the acceleration ends at timing t15 when the vehicle speed VS reaches the target speed VST. In this case as well, the driving of the internal combustion engine 90 and the braking device 92 is controlled so that the acceleration AC of the vehicle approaches the target acceleration ACT set in such a manner.

In the example shown by the solid line in FIG. 8(a) where the braking decreasing speed BPA is large, the target acceleration ACT (=ACB) is increased as compared with the example shown by the two-dot chain line in FIG. 8(a) where the braking decreasing speed BPA is small.

Thus, according to the control device 10, the speed control in which the acceleration AC of the vehicle is adjusted based on the braking decreasing speed BPA, which is the speed at which the driver of the vehicle decreases the operation amount of the brake pedal 82, that is, the manner of operating the brake pedal 82 can be performed. Even if there is a situation in which the braking operation amounts BPV are equal to each other, the acceleration required by the driver may be different if the braking decreasing speed BPA in each situation is different, but according to the control device 10, the speed control suitable for the request of the driver can be performed from the manner of operation of the brake pedal 82.

When the brake pedal 82 is operated so that the braking operation amount BPV increases, the target speed VST is calculated to be small based on the braking operation amount BPV Then, the target acceleration ACT until the vehicle speed VS reaches the target speed VST is calculated based on the relationship between the braking decreasing speed BPA and the reference acceleration ACB when the braking decreasing speed BPA is a negative value, and the vehicle speed control is performed. That is, when decreasing the vehicle speed VS toward the target speed VST, the deceleration of the vehicle is controlled based on the target acceleration ACT.

Figure 9A:
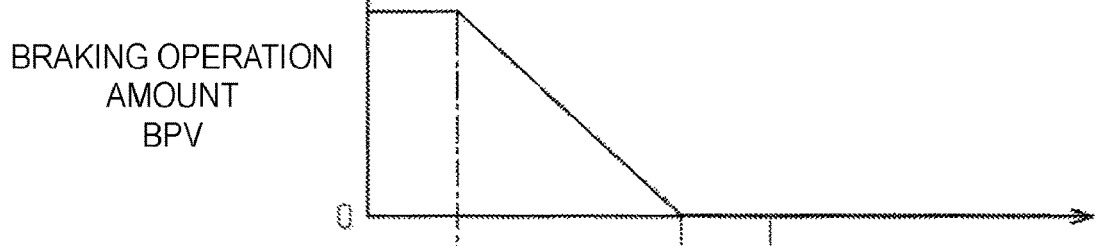
FIG. 9 is a timing chart when reverse speed control is executed by the control device.
Figure 9B:
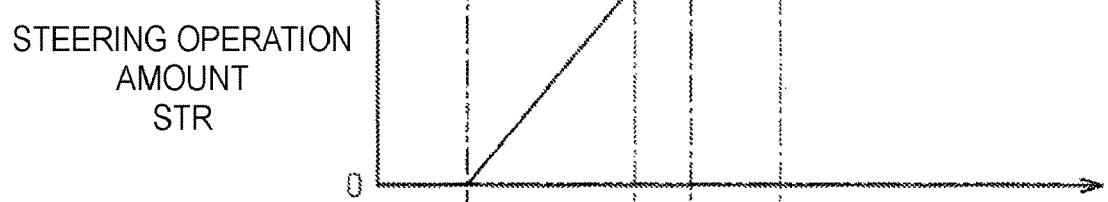
Figure 9C:
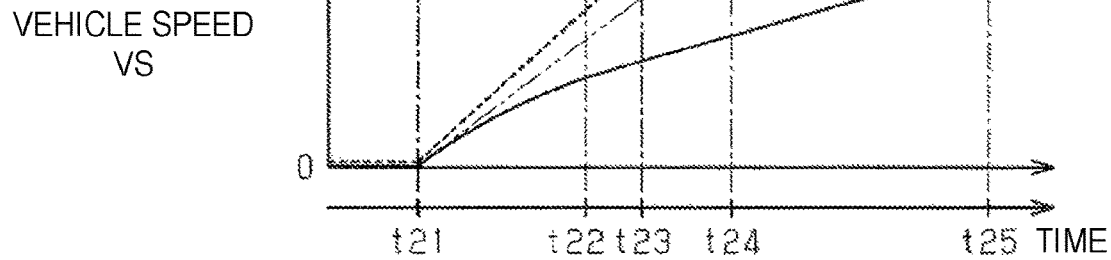

FIG. 9 shows change in the vehicle speed VS when the reverse speed control is executed. FIG. 9(*a*) shows the transition of the braking operation amount BPV In FIG. 9(*b*), an example of a case in which the steering operation is started at timing t21 is indicated by a solid line, and an example of a case in which the steering operation is not performed is indicated by a two-dot chain line. In FIG. 9(*c*), the transition of the target speed VST based on the braking operation amount BPV shown in FIG. 9(*a*) is indicated by a broken line. Furthermore, in FIG. 9(*c*), the transition of the vehicle speed VS corresponding to the example shown by the solid line in FIG. 9(*b*) is shown by the solid line. On the other hand, the transition of the vehicle speed VS corresponding to the example shown by the two-dot chain line in FIG. 9(*b*) is indicated by the two-dot chain line in FIG. 9(*c*).

After timing t21, the braking operation amount BPV starts to decrease as shown in FIG. 9(*a*) as the driver of the vehicle decreases the operation amount of the brake pedal 82. Then, as indicated by a broken line in FIG. 9(*c*), the target speed VST increases in conjunction with a decrease in the braking operation amount BPV Since the braking operation amount BPV becomes "0" at timing t23, the target speed VST is held at the value when the braking operation amount BPV is "0" after timing t23. Furthermore, the reference acceleration ACB is a value corresponding to the braking decreasing speed BPA.

Similarly, after timing t21, the steering operation is performed in the example indicated by the solid line in FIG. 9(*b*). During the period from timing t21 to timing t22, the steering operation amount STR increases. Since the steering operation amount STR is kept constant after timing t22, the steering operation speed STA is "0". On the other hand, in the example indicated by the two-dot chain line in FIG. 9(*b*), the steering operation amount STR is "0". Here, as described with reference to FIGS. 5 to 7, the acceleration suppression amount IHO is calculated to be greater as the absolute value of the steering operation amount STR becomes greater. That is, when the absolute value of the steering operation amount STR is large and the turning amount of the vehicle is large, the first suppression amount IH1 is calculated to be large, so that the acceleration suppression amount IHO is calculated to be large. The target acceleration ACT is a difference obtained by subtracting the acceleration suppression amount IHO from the reference acceleration ACB set based on the braking decreasing speed BPA. Therefore, the target acceleration ACT is smaller when the absolute value of the steering operation amount STR is large than when the absolute value of the steering operation amount STR is small. Even when speed control is performed with such target acceleration ACT and the braking decreasing speed BPA is large, the acceleration AC until the vehicle speed VS reaches the target speed VST is smaller when the absolute value of the steering operation amount STR is large than when the absolute value of the steering operation amount STR is small. Therefore, when there is no steering operation and the acceleration AC is large as shown by the two-dot chain line in FIG. 9(*c*), the vehicle speed VS reaches the target speed VST of the value when the braking operation amount BPV is "0" at timing t24. On the other hand, when the steering operation is performed and the acceleration AC is small as shown by the solid line in FIG. 9(*c*), the vehicle speed VS reaches the target speed VST of the value when the braking operation amount BPV is "0" at timing t25 after timing t24. That is, the vehicle can be accelerated more slowly as it becomes more difficult for the driver to check the rear side. Furthermore, the speed control at the time of reversing suitable for the potential request of the driver can be realized by changing the acceleration of the vehicle according to the difference in the absolute value of the steering operation amount STR in such a manner.

When the steering operation is being performed, the acceleration suppression amount IHO is calculated to be larger as the steering operation speed STA is larger. That is, as the steering operation speed STA is large and the driver's consciousness tends to concentrate on the steering operation, the second suppression amount IH2 is calculated to be large, so the acceleration suppression amount IHO is calculated to be large. Therefore, the target acceleration ACT is smaller when the steering operation speed STA is large than when the steering operation speed STA is small. Even when speed control is performed with such target acceleration ACT and the braking decreasing speed BPA is large, the acceleration AC until the vehicle speed VS reaches the target speed VST is smaller when the steering operation speed STA is large than when the steering operation speed STA is small. That is, the vehicle can be accelerated more slowly as the driver's consciousness tends to concentrate on the steering operation.

Figure 10:
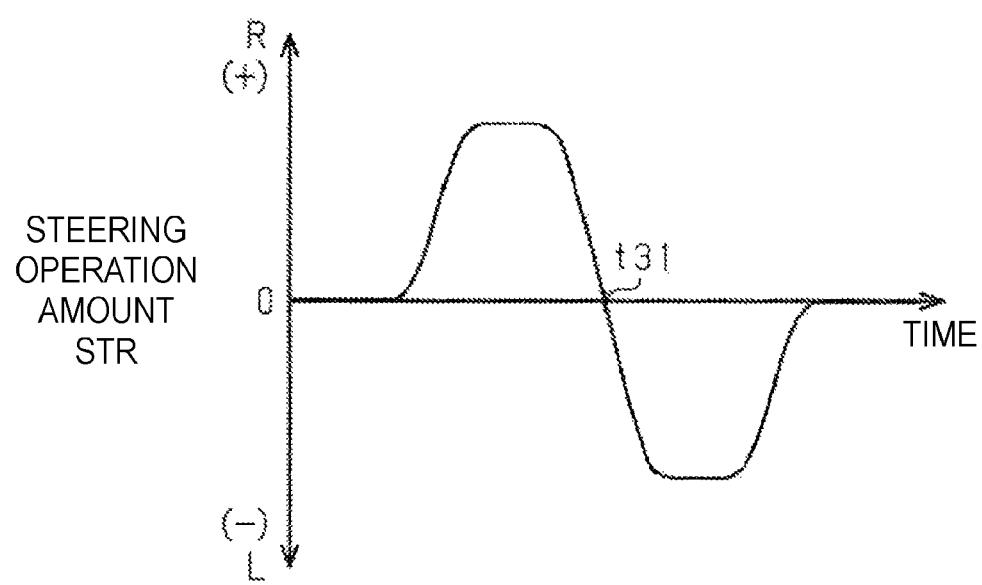
FIG. 10 is a graph showing change in the operation amount of the steering wheel.

FIG. 10 shows the transition of the steering operation amount STR when the operating direction of the steering wheel 83 is switched so as to shift the vehicle from the right turning state to the left turning state. Such a steering operation may be performed when, for example, performing parallel parking.

When the steering operation as shown in FIG. 10 is performed, assuming timing t31 is when the steering operation amount STR temporarily becomes "0", the sign of the steering operation amount STR is inverted before and after the timing t31. Therefore, in the vicinity of timing t31, the steering operation speed STA, which is the gradient variation of the steering operation amount STR, is in a large state, but the absolute value of the steering operation amount STR is in a temporarily small state. That is, in the vicinity of timing t31, the first suppression amount IH1 calculated based on the absolute value of the steering operation amount STR decreases. When the acceleration suppression amount IHO decreases as the first suppression amount IH1 decreases, the target acceleration ACT increases as it approaches timing t31, and the vehicle may suddenly accelerate.

In this regard, according to the reverse speed control executed by the control device 10, as described with reference to FIG. 5, when the steering operation speed STA is greater than or equal to the specified speed STAth (S204: YES), the value obtained by adding the second suppression amount IH2 to the lower limit suppression amount IHL is set as the acceleration suppression amount IHO (S205). That is, even when the steering operation is performed across the position where the steering operation amount STR becomes "0", the acceleration suppression amount IHO is calculated with the lower limit suppression amount IHL as the minimum value. Thus, when the steering operation is being performed, the acceleration suppression amount IHO is secured so as not to fall below the lower limit suppression amount IHL, so that even if the absolute value of the steering operation amount STR temporarily decreases during the steering operation, the target acceleration ACT can be suppressed from increasing and the reverse speed control can be executed without causing the driver to feel uncomfortable.

Here, a case where the steering operation by the right rotation R of the steering wheel 83 is once performed and then the steering operation by the left rotation L is performed is illustrated, but similar operation effects can be obtained even in a case where the steering operation by the left rotation L of the steering wheel 83 is once performed and then the steering operation by the right rotation R is performed.

The present embodiment can be appropriately modified and implemented in the following mode.

In the embodiment described above, the target acceleration ACT is decreased by using the first suppression amount IH1 and the second suppression amount IH2 in the calculation of the acceleration suppression amount IHO, but the target acceleration ACT can be calculated by subtracting only the first suppression amount IH1 from the reference acceleration ACB. That is, if the steering operation amount STR is taken into account, the acceleration suppression amount IHO may be calculated without taking into account the steering operation speed STA.

In the embodiment described above, as shown in FIG. 5, when the steering operation speed STA is greater than or equal to the specified speed STAth (S203: YES), the sum of the lower limit suppression amount IHL and the second suppression amount IH2 is calculated as the acceleration suppression amount IHO regardless of the magnitude of the first suppression amount IH1 (step S205). However, this is not the sole case, and even when the steering operation speed STA is greater than or equal to the specified speed STAth (S203: YES), if the first suppression amount IH1 calculated in step S201 is greater than the lower limit suppression amount IHL, the sum of the first suppression amount IH1 and the second suppression amount IH2 may be calculated as the acceleration suppression amount IHO. That is, the process of step S204 may be performed instead of the process of step S205.

Figure 11:
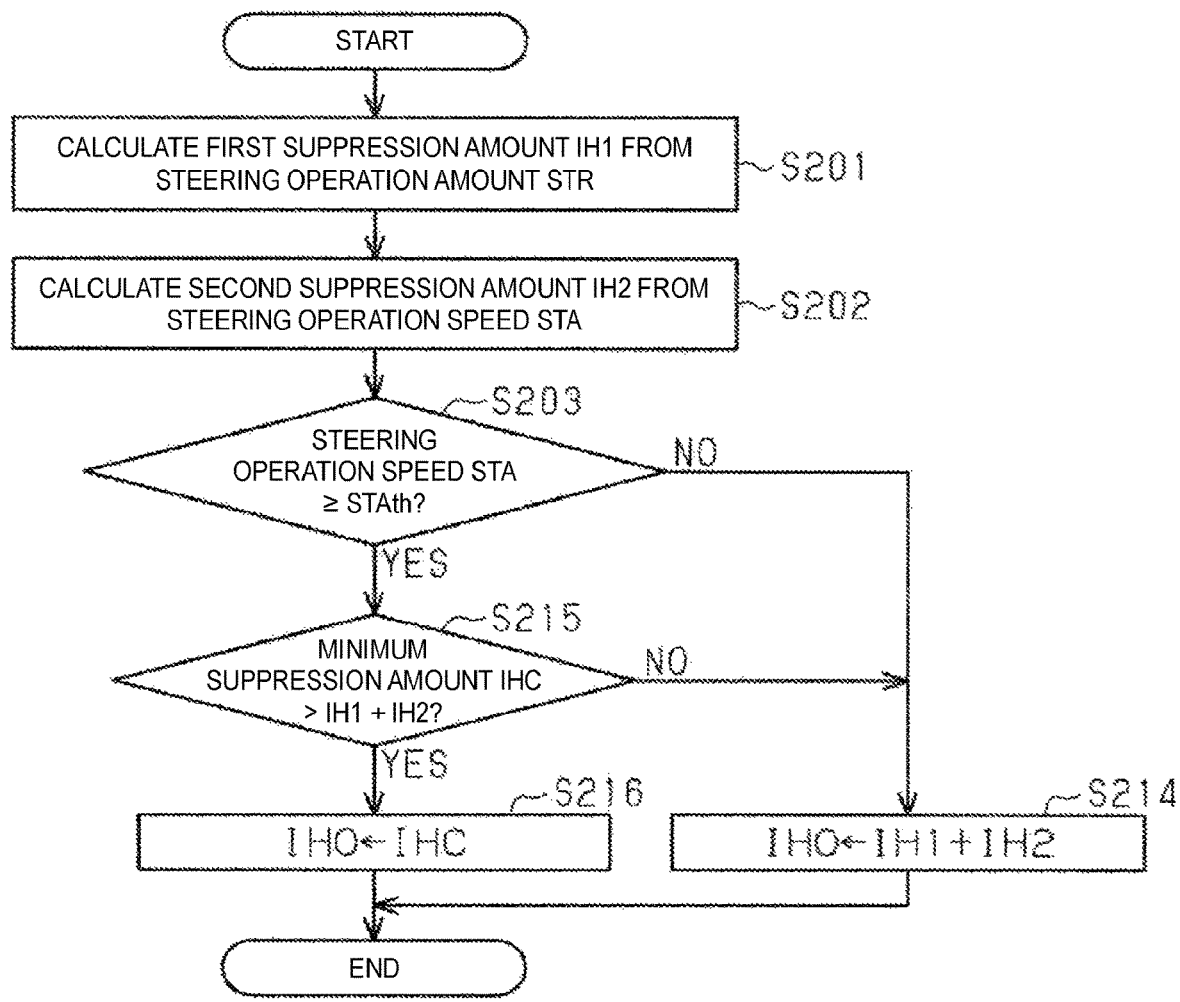
FIG. 11 is a flowchart showing a processing routine of an acceleration suppression amount calculation process executed by a control device according to a modified example.

In the embodiment described above, the processing routine shown in FIG. 5 is executed as the acceleration suppression amount calculation process, but the suppression amount setting unit 13 may execute the processing routine shown in FIG. 11 instead of FIG. 5 as the acceleration suppression amount calculation process.

The processes in step S201 and step S202 shown in FIG. 11 are the same as the processes described with reference to FIG. 5, and thus the description thereof will be omitted. In the processing routine shown in FIG. 11, in step S203, whether or not the steering operation speed STA is greater than or equal to a specified speed STAth is determined. When the steering operation speed STA is smaller than the specified speed STAth (S203: NO), the process proceeds to step S214. In step S214, the acceleration suppression amount IHO is calculated by adding the second suppression amount IH2 to the first suppression amount IH1. Thereafter, the present processing routine is terminated. On the other hand, when the steering operation speed STA is greater than or equal to the specified speed STAth (S203: YES), the process proceeds to step S215.

In step S215, whether or not a value obtained by adding the second suppression amount IH2 to the first suppression amount IH1 is smaller than the minimum suppression amount IHC is determined. When the value obtained by adding the second suppression amount IH2 to the first suppression amount IH1 is greater than or equal to the minimum suppression amount IHC (S215: NO), the process proceeds to step S214. On the other hand, when the value obtained by adding the second suppression amount IH2 to the first suppression amount IH1 is smaller than the minimum suppression amount IHC (S215: YES), the process proceeds to step S216. In step S216, the value of the minimum suppression amount IHC is set to the acceleration suppression amount IHO. Thereafter, the present processing routine is terminated.

Thus, when the steering operation speed STA is greater than or equal to the specified speed STAth, the sum of the first suppression amount IH1 and the second suppression amount IH2 is compared with the minimum suppression amount IHC, and the larger value can be set as the acceleration suppression amount IHO. Thus, when the steering operation is being performed, the acceleration suppression amount IHO is set to a value greater than or equal to the minimum suppression amount IHC. Therefore, even if the absolute value of the steering operation amount STR is temporarily reduced during the steering operation, the target acceleration ACT is suppressed from increasing, and the reverse speed control can be executed without causing the driver to feel uncomfortable.

As a map showing the relationship between the steering operation amount STR and the first suppression amount IH1, a map for a case where the steering operation speed STA is greater than or equal to the specified speed STAth and a map for a case where the steering operation speed STA is less than the specified speed STAth may be provided separately. The map for the case where the steering operation speed STA is greater than or equal to the specified speed STAth is such that the first suppression amount IH1 does not become less than or equal to the specified amount (>0) even when the steering operation amount STR becomes less than or equal to "STR0". On the other hand, a map shown in FIG. 6 can be adopted as a map for the case where the steering operation speed STA is less than the specified speed STAth. Thus, when the steering operation speed STA is greater than or equal to the specified speed STAth, the acceleration suppression amount IHO can be prevented from easily decreasing even if the operation amount of the steering wheel 83 is small by using the map for the case where the steering operation speed STA is greater than or equal to the specified speed STAth.

The sum of the first suppression amount IH1 and the second suppression amount IH2 may be set as the acceleration suppression amount IHO regardless of whether the steering operation speed STA is greater than or equal to the specified speed STAth.

In the embodiment described above, the acceleration control unit 11 calculates the target acceleration ACT using the reference acceleration ACB calculated by the reference setting unit 14 and the acceleration suppression amount IHO calculated by the suppression amount setting unit 13, but the calculation of the acceleration suppression amount IHO is not an essential component. That is, the acceleration control unit 11 may calculate the target acceleration ACT by referring to the braking operation amount BPV and the braking decreasing speed BPA, the accelerator operation amount APV and the accelerator operation speed APA, the steering operation amount STR, and the steering operation speed STA. According to the configuration in which the target acceleration ACT is decreased as the absolute value of the steering operation amount STR is increased, and the target acceleration ACT is decreased as the steering operation speed STA is increased, effects similar to the above embodiments can be obtained.

The vehicle to which the control device 10 is applied may be an electric vehicle having an electric motor as a power source of the vehicle, or a hybrid vehicle having both the internal combustion engine 90 and the electric motor as power sources.

The invention claimed is:

1. A vehicle speed control device comprising:
a target speed setting unit that sets a target speed, which is a target value of a vehicle speed when a vehicle is reversing, based on a braking operation amount of the vehicle when a reverse range is selected with a shift device of the vehicle; and
an acceleration control unit that controls an acceleration of the vehicle until the vehicle speed when raising the vehicle speed toward the target speed when a vehicle is reversing reaches the target speed,
wherein when a position of a steering wheel when the vehicle is moving straight is a reference position, the acceleration control unit decreases the acceleration of the vehicle until the vehicle speed when a vehicle is reversing reaches the target speed as the operation. amount of the steering wheel from the reference position increases, and
wherein the acceleration control unit decreases the acceleration of the vehicle until the vehicle speed when the vehicle is reversing reaches the target speed based on an operation speed of the steering wheel increasing.

2. The vehicle speed control device according to claim 1, further comprising:
a reference setting unit that sets a reference acceleration so that the reference acceleration of the vehicle increases as a decreasing speed of the braking operation amount increases; and
a suppression amount setting unit that sets a suppression amount so that the suppression amount increases as the operation amount of the steering wheel increases,
wherein the acceleration control unit sets a difference obtained by subtracting the suppression amount from the reference acceleration as a target acceleration which is a target value of an acceleration when raising the vehicle speed when the vehicle is reversing toward the target speed.

3. The vehicle speed control device according to claim 2, wherein the suppression amount setting unit sets the suppression amount so that the suppression amount increases as the operation speed of the steering wheel increases.

4. The vehicle speed control device according to claim 3, wherein when the operation speed of the steering wheel is greater than or equal to a specified speed, the suppression amount setting unit sets the suppression amount so that a minimum value of the suppression amount when the operation speed is greater than or equal to the specified speed becomes greater than a minimum value of the suppression amount when the operation speed is less than the specified speed.

5. The vehicle speed control device according to claim 2, wherein the suppression amount setting unit sets the suppression amount based on a sum of a first suppression amount, which is a value based on the operation amount of the steering wheel, and a second suppression amount, which is a value based on the operation speed of the steering wheel.

6. A vehicle speed control device comprising circuitry configured to
set a target speed, which is a target value of a vehicle speed when a vehicle is reversing, based on a braking operation amount of the vehicle when a reverse range is selected with a shift device of the vehicle; and
control an acceleration of the vehicle until the vehicle speed when raising the vehicle speed toward the target speed when a vehicle is reversing reaches the target speed,
when a position of a steering wheel when the vehicle is moving straight is a reference position, decrease the acceleration of the vehicle until the vehicle speed when a vehicle is reversing reaches the target speed as the operation amount of the steering wheel from the reference position increases, and.
decrease the acceleration of the vehicle until the vehicle speed when the vehicle is reversing reaches the target speed based on an operation speed of the steering wheel increasing.

7. The vehicle speed control device according to claim 6, wherein the circuitry is further configured to
set a reference acceleration so that the reference acceleration of the vehicle increases as a decreasing speed of the braking operation amount increases,
set a suppression amount so that the suppression amount increases as the operation amount of the steering wheel increases, and
set a difference obtained by subtracting the suppression amount from the reference acceleration as a target acceleration which is a target value of an acceleration when raising the vehicle speed when the vehicle is reversing toward the target speed.

8. The vehicle speed control device according to claim 7, wherein the circuitry is configured to set the suppression amount so that the suppression amount increases as the operation speed of the steering wheel increases.

9. The vehicle speed control device according to claim 8, wherein when the operation speed of the steering wheel is greater than or equal to a specified speed, the circuitry is configured to set the suppression amount so that a minimum value of the suppression amount when the operation speed is greater than or equal to the specified speed becomes greater than a minimum value of the suppression amount when the operation speed is less than the specified speed.

10. The vehicle speed control device according to claim 7, wherein the circuitry is configured to set the suppression amount based on a sum of a first suppression amount, which is a value based on the operation amount of the steering wheel, and a second suppression amount, which is a value based on the operation speed of the steering wheel.

* * * * *